United States Patent Office

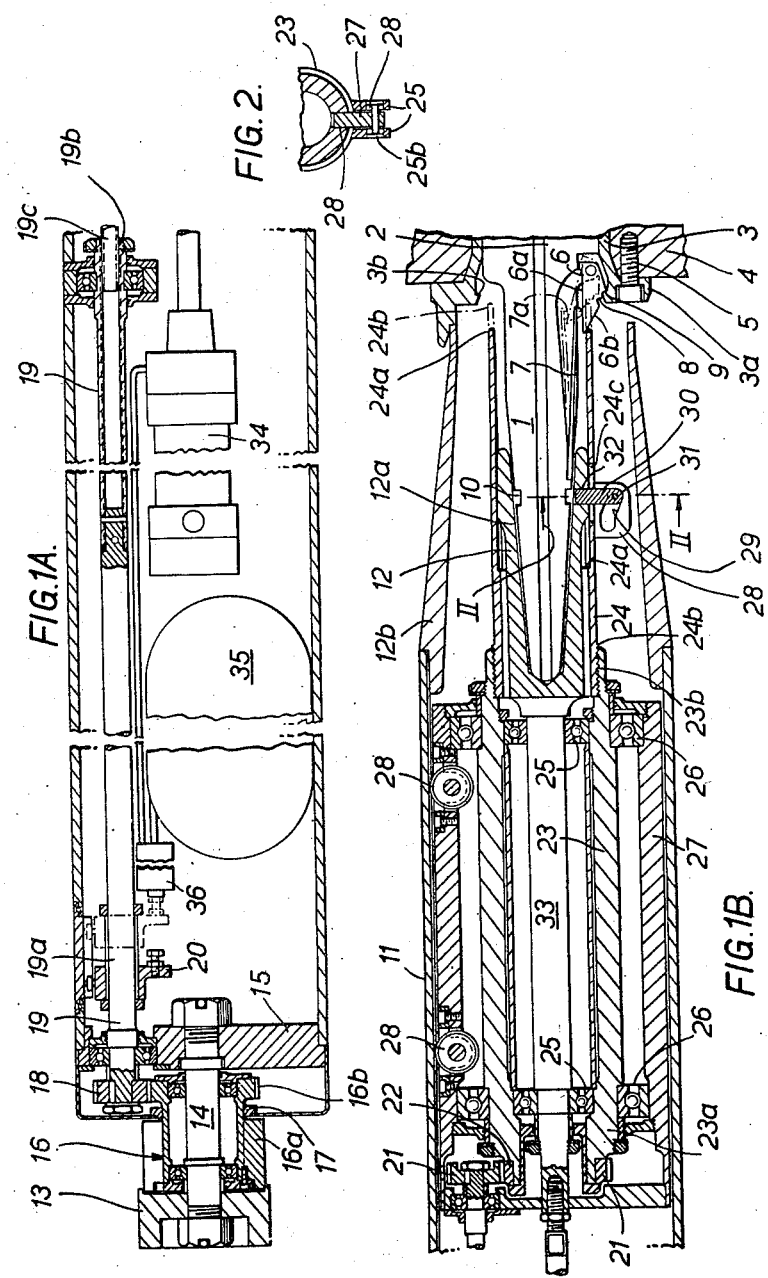

3,192,119
Patented June 29, 1965

3,192,119
DEVICE FOR SERVICING NUCLEAR REACTORS
Samuel Brittan Hosegood, Weymouth, Dorset, Bernard William Collins, Dorchester, and Cecil Harper, Preston, Weymouth, Dorset, England, assignors to United Kingdom Atomic Energy Authority, London, England
Filed Dec. 4, 1961, Ser. No. 156,766
Claims priority, application Great Britain, Dec. 12, 1960, 42,638/60
8 Claims. (Cl. 176—30)

This invention relates to nuclear reactors and more particularly it relates to means for withdrawing reactor components from positions within a reactor core normally accessible only by the fuel element charge-discharge machine herein referred to as a charge machine.

According to the present invention there is provided a device for withdrawing a component from a nuclear reactor which comprises a casing arranged for manipulation by the reactor charge machine, gripping means carried by said casing for gripping the component, means within the casing for exerting a force on said gripping means to detach the component from its mounting and for withdrawing the component into the casing.

The device may be particularly adapted as a tool for the withdrawal of a nuclear fuel element mounting member from its supporting grid or like structure, the device having end fittings similar to a nuclear fuel element manipulated by the charge machine so that the tool can be placed on the mounting member by the charge machine, the tool having means for gripping the mounting member and for unlatching the member from the grid.

To this end, the removal tool may include a casing which houses a servo-assisted mechanism or transducer adapted, on operation, to apply an additional force to the mounting member in a sense to withdraw the member from the grid.

One embodiment of the invention is shown, by way of example, in the accompanying drawing in which:

FIGS. 1A and 1B show an axial cross-sectional view, broken into two parts, of a removable fuel element mounting member for a nuclear reactor with a removal tool fitted preparatory to withdrawal of the member from its base plate, and FIG. 2 is a section on the line II—II of FIG. 1B.

In FIG. 1B, the fuel element mounting member comprises a conical fuel spike 1 having a cylindrical base part 2 which is a push fit in a vertical sleeve 3 within a hole in a horizontally arranged supporting grid or base plate 4. The sleeve 3 has a collar 3a which laps over the marginal portion of the hole and fixing bolts 5 secure the collar to the base plate 4. The inner rim of the collar 3a is under cut at 3b to provide an abutment for a latch 6 pivotally mounted on the fuel spike.

The fuel spike 1 carried three elongated spring tongues 7 each of which is secured at one end of the spike and has its free end formed with a bearing pad 7a which bears on the latch 6 tending to bias the latch arm 6a in a radially outward direction. The latch arm 6a of each latch has an inclined face 6b in which two notches 8, 9 are formed, the notch 9 being maintained, during operation of the reactor, in engagement with the undercut portion 3b on the sleeve collar 3a by the action of the tongue 7, so serving to retain the mounting spike 1 in the sleeve 3.

The fuel spike 1 has an annular groove 10 about midway along its length for engagement by the removal tool as described below.

The removal tool comprises an elongated cylindrical casing 11 of a length substantially equal to that of a fuel element which would be mounted on the fuel spike during operation of the reactor. The casing 11 has end fittings corresponding to those of such a fuel element; namely a cylindrical piece 12 having a tapered bore 12a complementary to the shape of the fuel spike 1 (FIG. 1B) and a flanged head piece 13 (FIG. 1A) shaped so as to be gripped and manipulated by the grapple of the charge machine (not shown). The cylindrical piece 12 is enclosed by a shroud 12b attached at one end of the casing 11.

The flanged head-piece 13 is secured to the adjacent end of the casing by a stud 14 which is anchored to a plate 15 within the casing. A compound gear member 16 rotatable on stud 14 extends through a seal 17 into the interior of the casing and provides at 16a three annularly spaced splines and gear teeth 16b respectively on each side of the casing end wall. The splines 16a are adapted to be driven by jaws, or equivalent, carried by the charge/discharge machine while gear teeth 16b mesh with a pinion 18 fixed to a shaft 19 rotatably mounted in the casing. The shaft 19 has a screw threaded portion 19a which engages a threaded hole in a trip carriage 20. The carriage 20 is movable axially on rotation of the shaft 19, to actuate a valve as hereinafter described. The end portion of the shaft 19 is formed in two telescopic sections 19b, 19c. The terminal portion of the section 19c carries a gear wheel 21 which meshes with an external annular gear 22 formed on an adjacent end 23a of a tube 23, the other end of which is screw threaded internally at 23b. An actuating sleeve 24 is screw threaded externally at 24b to engage with the screw threaded portion 23b so as to be movable longitudinally in response to rotation of the tube 23 and has splines 24a to engage with complementary splines on the cylindrical piece 12. The sleeve 24 and the cylindrical piece 12 form first and second, co-axial tubular members respectively. The tube 23 has two, internal and external sets of radial bearings, 25, 26, the internal set 25 spacing the tube from a central axial ram rod 33 (described below) and the external set 26 being supported on an outer concentric tube 27. The latter is slidably mounted on the inner face of the casing 11 and to minimize friction due to this sliding movement carries three pairs of axially spaced rollers, one set of which 28 is shown in FIG. 1B. The arrangement of the tube 23, bearings, 25, 26 and outer tube 27 is such that these parts move axially within the casing 11 on axial movement of the ram rod 33.

The actuating sleeve 24 carries three pairs of lugs 29 (only one of which is shown in the drawings) at 120° intervals around its periphery, each lug having a cam-shaped slot 29a. A square section pin 30 is carried on a pair of rollers 31, mounted one in each slot of a pair of lugs 29, and this pin extends through an elongated hole 24c in the sleeve 24 entering a square section hole 32 which pierces the cylindrical piece 12. The engagement of the pin 30 with the hole 32 ensures that the pin assumes a position normal to the axis of the cylindrical piece. The disposition of the pins 30 is such that, when the tool is applied to the spike (as shown) the free end of each pin 30 lies adjacent the groove 10 in the fuel spike. It will be seen that by movement of the sleeve 24 endwise towards the base plate 4, the pins 30 will move radially inwards to engage the annular groove 10 by virtue of the contour of the cam-shaped slots 29a. The free end of the actuating sleeve 24 with the face 6b of latch arm 6a, these parts being maintained in engagement by the action of the spring tongues 7.

The cylindrical piece 12 is integrally formed with a ram rod 33 which extends axially within and through the concentric tubes 23, 27 described above. The ram rod 33 enters a ram cylinder 34, supported within the casing 11, wherein it carries a piston (not shown) and the working end of the cylinder communicates with a reservoir 35 of pressure fluid (which in the case of gas cooled reactors is compressed coolant gas) under control of a valve 36. The control valve 36 is actuated to communicate the reservoir 35 with the ram cylinder 34 by the trip carriage 20 (if desired through the carriage acting on an intermediate pilot valve not shown).

In order to effect the removal of a fuel spike 1 from the supporting grid or base plate 4, the removal tool is lowered on to the mounting spike by the usual reactor charge/discharge machine, the grapple of which is adapted to grip the flanged head 13 and the splines 16a of the compound gear member 16. The cylindrical piece 12 centres the tool on the spike 1 and the free end of the actuating sleeve 24 engages the latch 6 in the position shown in full lines (FIG. 1B).

The grapple is then rotated four turns which imparts through compound gear 16 and gear 18, eight revolutions to the shaft 19. On rotation of the shaft 19, the trip carriage 20 moves part way along the shaft towards the actuating member of valve 36 and simultaneously the tube 23 is rotated through gearing 21, 22 and drives the actuating sleeve 24 through screw drive 23b, 24b axially towards the base plate 4. The free end of the sleeve 24 moves into the position shown in dotted outline and rocks the latch arm 6a moving it radially inwards so that firstly the notch 9 disengages from the undercut portion 3b and secondly the tip of the free end moves to a position just short of the notch 8. The latch 6 is thus disengaged and retained in an unlatched position. Simultaneously, the axial movement of the lugs 29 causes the pins 30 to move radially into engagement with the annular groove 10 so gripping the spike 1 at three points.

The next operation is to withdraw the fuel spike from its mounting in the grid and cause it to pass into the casing 11, the overall length of the casing which then encloses the fuel spike being no greater (but in fact equal to) the overall length of a fuel element, which element the charge/discharge machine has been designed to handle. In some cases also the head-room above the grid is limited by the length of a fuel element.

In this example the withdrawal of the fuel spike is performed by a force amplifying means utilizing the energy of pressure gas in reservoir 35. To this end the grapple is rotated a further one turn which has the effect of moving the trip carriage 20 along the shaft 19 into the position shown in dotted outline and thence into contact with the actuating member of the valve 36 whereupon the pressure fluid in the reservoir 35 is applied to the ram cylinder 34. The ram piston is urged under the action of the pressure fluid axially in a sense to retract the cylindrical piece 12 and therewith the fuel spike into the casing 11. As the piston rod 33 and the cylindrical piece 12 enter the casing, the concentric tubes 23, 27 move with the rod 33, an axial thrust being applied to the tubes through the two sets of radial bearings 25, 26. Simultaneously, the portion 19c of the shaft 19 telescopes within the portion 19b.

The removal tool and the fuel spike together occupy no greater length than a fuel element and can then be removed from the charge/discharge machine by usual fuel element handling techniques.

By reversing the above described procedure a new fuel element mounting spike can be put into the reactor grid or base plate 4.

Although in the above example, a pressure fluid operated servo is used to withdraw the fuel spike into the tool any other means, not necessarily a servo assisted means, may be employed to achieve this. For example, a mechanical jacking system may be employed between the shaft 19 and the cylindrical piece 12, to exert, on rotation of staff 19, a sufficient withdrawal thrust on the fuel spike to move it from the grid 4 into the casing 11.

In order to prevent the inadvertent rotation, or spin, of the casing 11 whilst it is being inserted into or removed from the reactor by the charge/discharge machine with the resultant rotation of gearing 16, 18 and operation of the parts connected thereto, the flanged head 13 may be positively locked to the charge/discharge machine grapple during this operation as by causing a portion of the grapple to engage with a recess in the underside of the head 13 whereby relative rotation between the gear 16 and the casing 11 is, for the time being, prevented.

We claim:

1. A device for withdrawing a component from a nuclear reactor comprising a casing, an actuating head on said casing, first and second members mounted for translatory movement within said casing, gripping jaws carried by said first member and engageable with a component to be withdrawn by translatory motion of said first member, force amplifying means between said actuating head and said second member and means to apply the force through said second member to the gripping jaws, whereby a component is withdrawn from a nuclear reactor into said casing.

2. A device as claimed in claim 1 in which said force amplifying means is a pressure fluid servo including a reservoir of pressure fluid.

3. A device as claimed in claim 2 in which the second member is a cylindrical piece comprising a ram and a cooperating cylinder, and said force amplifying means includes a conduit connecting said cooperating cylinder and said reservoir and further includes a valve in said conduit operable by said actuating head.

4. A device as claimed in claim 1 in which the actuating head is a rotary member.

5. A device as claimed in claim 1 in which the first and second members are co-axial tubular members.

6. A device for withdrawing a component from a nuclear reactor comprising a casing, a rotary actuating head on said casing, first and second tubular members, means mounting said first and second tubular members within said casing for translatory movement relative to the casing, means transmitting rotary motion of the actuating member to translatory motion of the first member, gripping jaws carried by said first member, means moving the jaws into engagement with a reactor component on translation of the first member, a force amplifying means within the casing operable by said actuating member to exert translatory movement to the second member to withdraw the component into the casing.

7. A device for withdrawing a component from a nuclear reactor as claimed in claim 6 in which the first and second members are co-axial tubular members, the first being disposed outside of said second member and carrying jaws engageable with said second member.

8. A device as claimed in claim 7 in which the second member has holes for receiving said jaws.

References Cited by the Examiner

UNITED STATES PATENTS

| | | | |
|---|---|---|---|
| 2,756,858 | 7/56 | Kasschan | 176—30 |
| 2,851,410 | 9/58 | Vernon et al. | 176—30 |
| 3,039,949 | 6/62 | Newton et al. | 176—30 |

FOREIGN PATENTS

| | | |
|---|---|---|
| 1,228,915 | 3/60 | France. |
| 1,230,566 | 4/60 | France. |
| 1,236,554 | 6/60 | France. |
| 1,055,705 | 4/59 | Germany. |

REUBEN EPSTEIN, *Acting Primary Examiner.*

CARL D. QUARFORTH, *Examiner.*